Aug. 14, 1951  L. J. FISCHER  2,564,475
DEHYDRATION OF FROZEN FOODS
Filed Nov. 15, 1946
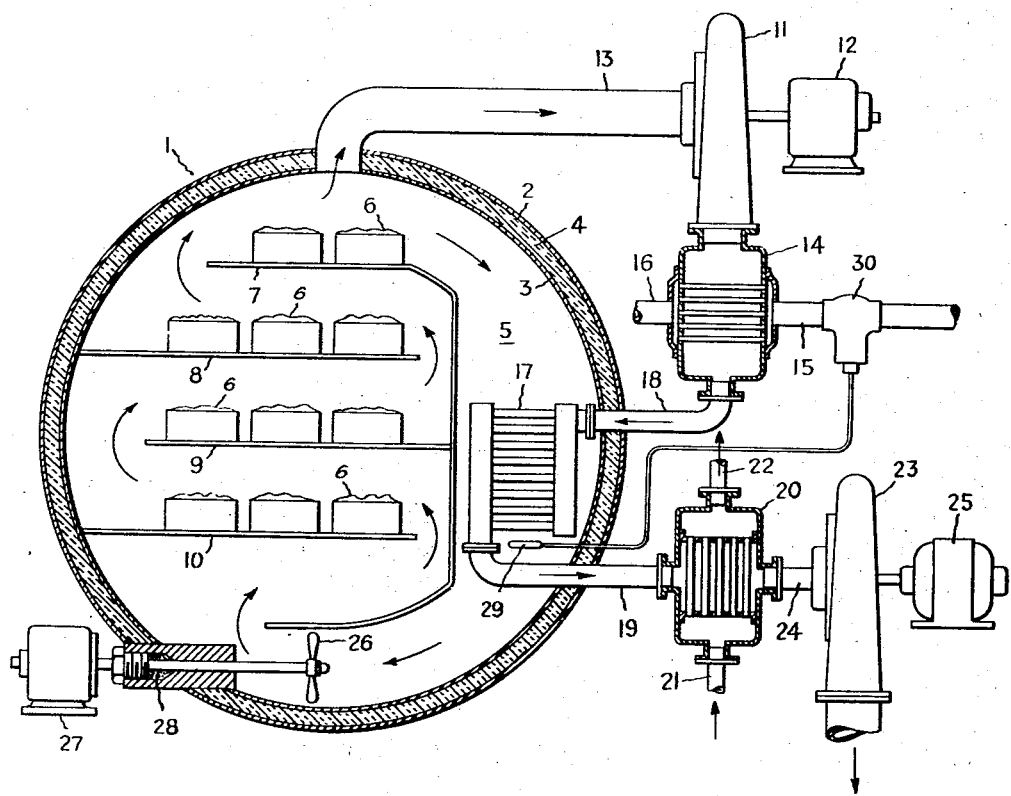
Inventor:
Leander J. Fischer,
by Edwin L. Rich
His Attorney.

Patented Aug. 14, 1951

2,564,475

UNITED STATES PATENT OFFICE 2,564,475

DEHYDRATION OF FROZEN FOODS

Leander J. Fischer, Marblehead, Mass., assignor to General Electric Company, a corporation of New York Application November 15, 1946, Serial No. 709,934

6 Claims. (Cl. 34—43)

My invention relates to dehydrating apparatus and particularly to such apparatus for dehydrating frozen foods.

In their distribution frozen foods are frequently transported for large distances and are handled a number of times during the process of distribution. The removal of frozen moisture from such foods would result in a reduction in weight and thus would be desirable both from a handling and a shipping standpoint. The various types of frozen foods have different critical temperatures. If the food is allowed to rise above its critical temperature there may be damage to its cell structure, deterioration in quality, and the preservation of food will be materially affected. Hence, in any process for the removal of the frozen moisture from the frozen foods it is necessary that the temperature of the foods be maintained below the critical temperature involved. Accordingly, it is an object of my invention to remove frozen moisture from frozen foods while maintaining their temperature below that which is critical for their proper preservation.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawing, the single figure of which represents apparatus embodying my invention.

Referring to the drawing, I have provided a casing or housing 1 for holding frozen foods during dehydration. This casing may be constructed for example of an outer shell 2, an inner shell 3, between which is placed any suitable thermal insulation 4. This provides an enclosure 5 within which the frozen foods, indicated at 6, to be dehydrated are placed. In order to support the frozen foods within the enclosure 5 several shelves, indicated as 7, 8, 9 and 10, are provided. As will be explained later in this specification, these shelves are so arranged as to provide an extended path for the atmosphere circulating within the enclosure 5. A compressor 11, which is driven by a motor or any other suitable prime mover 12, is provided to withdraw atmosphere from the enclosure 5 and to compress this withdrawn atmosphere. In order to permit the withdrawal of atmosphere from the enclosure 5 for reducing the pressure therein, the inlet of the compressor 11 is connected with the aforementioned enclosure by a conduit 13. The outlet of this compressor is connected to a heat exchanger 14, the purpose of which will be explained in detail later in this specification. The heat exhanger 14 is cooled by a suitable cooling medium, which is supplied through a pipe 15 and is exhausted through a pipe 16.

A second heat exchanger 17 is provided within the enclosure 5 for the purpose of transmitting heat from the compressed atmosphere to the atmosphere within the enclosure 5. The inlet of this heat exchanger is connected with heat exchanger 14 by a conduit 18. The outlet of heat exchanger 17 is connected by a conduit 19 to a third heat exchanger 20. Any suitable cooling medium is supplied to heat exchanger 20 through a pipe 21 and is exhausted through a pipe 22. This heat exchanger is included in order to condense any condensable constituents of the compressed atmosphere and also to facilitate the final exhausting of the noncondensable constituents of this atmosphere.

In order to perform the initial evacuation of the enclosure 5 and also to dispose of any air leakage into the system an air pump 23 is provided. This air pump 23 is connected to the heat exchanger 20 by means of a conduit 24. The pump 23 is driven by a motor or any other suitable prime mover 25.

In order to circulate the atmosphere within the enclosure 5 over the heat exchanger 17 and over the various articles of frozen food in the enclosure, a fan 26 is placed in the lower portion of the enclosure. A motor or any other suitable prime mover 27 for driving the fan 26 is placed outside the casing or housing 1 and is connected to the fan by a shaft passing through an opening in this casing or housing 1. This opening is sealed in any suitable manner, for example by the use of a stuffing box 28. The arrangement of the shelves 7, 8, 9 and 10, referred to earlier in the specification, and the location of the fan 26 cause a movement of the atmosphere within the enclosure 5 over the heat exchanger 17 and in a tortuous path about the frozen foods, as indicated by the arrows in the drawing. If desired, baffles other than the shelves may be employed for directing the atmosphere.

In order to control the amount of heat which is transmitted through the heat exchanger 17 to the atmosphere within the enclosure 5 and thus to keep the temperature within the enclosure below the critical temperature for the frozen food involved, suitable apparatus is provided for controlling the flow of cooling medium through the heat exchanger 14. As illustrated in the drawing such controlling apparatus consists of a suitable device, such as a thermostatically controlled valve 30 which controls the flow of cooling medium through the heat exchanger 14. The valve 30 is controlled by a thermostat 29 placed within the enclosure 5 so as to be responsive to the temperature therein. By controlling the flow of cooling medium through the heat exchanger 14 the temperature of the compressed atmosphere which is conducted to the heat exchanger 17 can be varied thus varying the amount of heat transmitted through the heat exchanger 17 to the atmosphere within the enclosure 5. Hence the temperature of the atmosphere in this enclosure and consequently the temperature of the frozen foods can be effectively controlled.

In the operation of my apparatus, the frozen foods to be dehydrated are placed within the enclosure 5 through a suitable door (not shown). The motors 12, 25 and 27 which drive respectively the compressor 11, the air pump 23, and the fan 26 are then started. The initial evacuation of atmosphere from the enclosure 5 is performed primarily by the pump 23. The compressor 11 continuously removes a portion of the atmosphere remaining in the chamber, compresses this atmosphere and supplies the compressed atmosphere through the heat exchanger 14 to the heat exchanger 17 within the enclosure 5. The temperature of the compressed atmosphere which passes through the heat exchanger 17 is controlled, as described previously in this specification, by varying the amount of cooling medium through the heat exchanger 14, this variation being accomplished by a valve 30 controlled in response to a thermostat 29. The fan 26 causes a continuous circulation of the atmosphere within the enclosure 5 over the heat exchanger 17 and thence about the frozen foods 6, thereby transferring heat from the compressed atmosphere to the frozen foods and causing a sublimation of a portion of the frozen moisture remaining in the food. Since there is a continuous withdrawal and compression of atmosphere by the compressor 11 and a continuous circulation of the atmosphere within the enclosure 5 by means of the fan 26, the progressive sublimation will result in a substantial dehydration of the frozen food while still maintaining the food below its critical temperature. Thus the operation of the apparatus results in a reduction in the weight of the frozen food by the dehydration thereof, but does not allow any deterioration of the food or cause any interference with the proper preservation thereof.

As the compressed atmosphere from the compressor 11 passes through the heat exchanger 14, some of the moisture sublimed from the frozen foods will be frozen in the heat exchanger 14. The compressed atmosphere then passes to the heat exchanger 17 and an additional amount of the moisture contained therein will be refrozen in the heat exchanger 17 as a result of the transfer of heat from the compressed atmosphere to the atmosphere within the chamber 5. Finally as the compressed atmosphere passes through the heat exchanger 20 an additional amount of moisture will be refrozen in this heat exchanger. In this way only a small amount of water vapor plus some non-condensable gases remain to be exhausted to atmosphere by the pump 23. The provision for refreezing the water vapor in the heat exchangers 14, 17 and 20 avoids the necessity of pumping all the water vapor from the low pressure of sublimation in the chamber 5 to atmospheric pressure at the exhaust side of pump 23, and thus the amount of power required is minimized. Preferably, the apparatus is operated on a batch basis, that is, the frozen foods are placed in the chamber 5 and the apparatus is run until the dehydration process is complete. Then the frozen foods are removed and the accumulated frost and ice is flushed from the heat exchangers 14, 17 and 20 by water or steam prior to the introduction of the next batch of frozen foods.

While I have shown a particular embodiment of my invention, I do not desire my invention to be limited to the particular construction shown and described and I intend, in the appended claims, to cover all modifications within the spirit and scope of my invntion.

What I claim as new and desire to secure by Letters Patent of the United States is:

1. An apparatus for dehydrating frozen food comprising means providing an enclosure for frozen food, a first heat exchanger outside said enclosure, a second heat exchanger within said enclosure, compressing means for withdrawing atmosphere from said enclosure to maintain a predetermined low pressure therein and for supplying the compressed atmosphere through said first heat exchanger to said second heat exchanger, means responsive to the temperature of the atmosphere within said enclosure for controlling said first heat exchanger to vary the temperature of the compressed atmosphere supplied to said second heat exchanger, and a fan for circulating the atmosphere of said enclosure about said second heat exchanger and about said frozen food to dehydrate the food by sublimation.

2. An apparatus for dehydrating frozen food comprising means providing an enclosure for frozen food, a first heat exchanger outside said enclosure, a second heat exchanger within said enclosure, compressing means for withdrawing atmosphere from said enclosure to maintain a predetermined low pressure therein and for supplying the compressed atmosphere through said first heat exchanger to said second heat exchanger, means responsive to the temperature of the atmosphere within said enclosure for controlling said first heat exchanger to vary the temperature of the compressed atmosphere supplied to said second heat exchanger, means within said enclosure for directing the atmosphere within said enclosure in a tortuous path about the frozen food, and a fan for circulating the atmosphere within said enclosure about said second heat exchanger and about said frozen food to dehydrate the food by sublimation.

3. An apparatus for dehydrating frozen food comprising means providing an enclosure for frozen food, a first heat exchanger outside said enclosure, a second heat exchanger within said enclosure, compressing means for withdrawing atmosphere from said enclosure to maintain a predetermined low pressure therein and for supplying compressed atmosphere through said first heat exchanger to said second heat exchanger, means responsive to the temperature of the atmosphere within said enclosure for controlling the first heat exchanger to vary the temperature of the compressed atmosphere supplied to said second heat exchanger, a fan for circulating the atmosphere within said enclosure about said second heat exchanger and about the frozen food, a third heat exchanger outside said enclosure, a conduit extending between said second heat exchanger and said third heat exchanger for conducting the compressed atmosphere to said third heat exchanger, and means for exhausting the compressed atmosphere from said third heat exchanger to remove the compressed atmosphere from the apparatus.

4. An apparatus for dehydrating frozen food comprising means providing an enclosure for frozen food, a first heat exchanger outside said enclosure, a second heat exchanger within said enclosure, compressing means for withdrawing atmosphere from said enclosure to maintain a predetermined low pressure therein and for supplying compressed atmosphere through said first heat exchanger to said second heat exchanger, means responsive to the temperature of the atmosphere within said enclosure for controlling the first heat exchanger to vary the temperature of the compressed atmosphere supplied to said second heat exchanger, means within said enclosure for supporting the frozen food, said supporting means being arranged to direct the atmosphere within said enclosure in a tortuous path closely about the frozen food, a fan for circulating the atmosphere within said enclosure about said second heat exchanger and about the frozen food, a third heat exchanger outside said enclosure, a conduit extending between said second heat exchanger and said third heat exchanger for conducting the compressed atmosphere to said third heat exchanger, and a pump for exhausting the compressed atmosphere from said third heat exchanger to remove the compressed atmosphere from the apparatus.

5. An apparatus for dehydrating frozen food comprising means providing an enclosure for frozen food, compressing means for withdrawing atmosphere including water vapor from said enclosure to maintain a predetermined low pressure therein, a first heat exchanger outside said enclosure for cooling said atmosphere and for freezing a portion of the vapor therein, means for conducting the compressed atmosphere from said compressing means to said first heat exchanger, a second heat exchanger within said enclosure for transferring heat to the atmosphere within the enclosure and for freezing a portion of the water vapor in said compressed atmosphere, means for conducting compressed atmosphere from said first heat exchanger to said second heat exchanger, means responsive to the temperature of the atmosphere within said enclosure for controlling said first heat exchanger to maintain the temperature of the atmosphere within said enclosure below the critical temperature of the frozen food and means for exhausting said compressed atmosphere from the apparatus.

6. An apparatus for dehydrating frozen foods comprising means providing an enclosure for frozen foods, a first heat exchanger outside said enclosure, a second heat exchanger within said enclosure, compressing means for withdrawing atmosphere from said enclosure to maintain a predetermined low pressure therein and for supplying compressed atmosphere through said first heat exchanger to said second heat exchanger, and means responsive to the temperature of the atmosphere within said enclosure for controlling said first heat exchanger to vary the temperature of the compressed atmosphere supplied to said second heat exchanger.

LEANDER J. FISCHER.

REFERENCES CITED

The following references are of record in the file of this patent:

UNITED STATES PATENTS

| Number | Name | Date |
| --- | --- | --- |
| 76,591 | Brakely | Apr. 14, 1868 |
| 375,737 | Duryea et al. | Jan. 3, 1888 |
| 1,328,897 | Rice | Jan. 27, 1920 |
| 1,353,358 | Steenfeldt-Lindholm | Sept. 21, 1920 |
| 1,391,510 | Schjelderup | Sept. 20, 1921 |
| 1,425,005 | Gensecke | Aug. 8, 1922 |
| 1,827,846 | Holmquist | Oct. 20, 1931 |
| 2,292,447 | Irwin, Jr. | Aug. 11, 1942 |
| 2,345,548 | Flosdorf et al. | Mar. 28, 1944 |
| 2,435,503 | Levinson et al. | Feb. 3, 1948 |

FOREIGN PATENTS

| Number | Country | Date |
| --- | --- | --- |
| 3,080 of 1900 | Great Britain | Jan. 12, 1901 |